US005951296A

United States Patent [19]

Klein

[11] Patent Number: 5,951,296

[45] Date of Patent: Sep. 14, 1999

[54] OPTICAL SPRAY PAINTING PRACTICE AND TRAINING SYSTEM

[75] Inventor: Richard J. Klein, Waterloo, Iowa

[73] Assignee: University of Northern Iowa Foundation (UNIF), Cedar Falls, Iowa

[21] Appl. No.: 08/965,104

[22] Filed: Nov. 6, 1997

[51] Int. Cl.$^{6}$ .................................................... G09B 11/10

[52] U.S. Cl. ................................ 434/84; 434/11; 356/375

[58] Field of Search ............................ 434/11, 84; 239/1, 239/289; 356/375

[56] References Cited

U.S. PATENT DOCUMENTS

| | | | |
|---|---|---|---|
| 3,784,804 | 1/1974 | Sabatelli | 362/96 |
| 4,291,839 | 9/1981 | Brett | 239/289 |
| 5,331,468 | 7/1994 | Noethen | 359/738 |
| 5,598,972 | 2/1997 | Klein | 239/1 |
| 5,757,498 | 5/1998 | Klein | 356/375 |

*Primary Examiner*—Kien T. Nguyen
*Assistant Examiner*—Kurt Fernstrom
*Attorney, Agent, or Firm*—Andrus, Sceales, Starke & Sawall

[57] ABSTRACT

An optical spray painting practice gun emits a shaped optical beam onto a practice surface to simulate an actual paint spray on the surface. The gun preferably uses a class 2 diode laser to generate a laser beam which is reshaped by a collimating lens into a diverging beam that illuminates the practice surface. The collimating lens creates an elongated image on the practice surface having a length corresponding linearly to the distance of the practice gun nozzle to the practice surface as with a conventional spray gun. The illuminated image distorts when the practice gun is not perpendicular to the practice surface. The collimating lens is located in a rotatable collar so that the orientation of the elongated image on the practice surface can be adjusted. In other respects, the structure of the practice gun is preferably the same as a conventional spray gun. A DC battery is contained in the removable paint container for the practice gun and supplies power to the laser when a trigger-actuated electric switch is engaged. Placing the battery in the removable container helps to simulate proper spray gun weight and weight distribution.

18 Claims, 4 Drawing Sheets

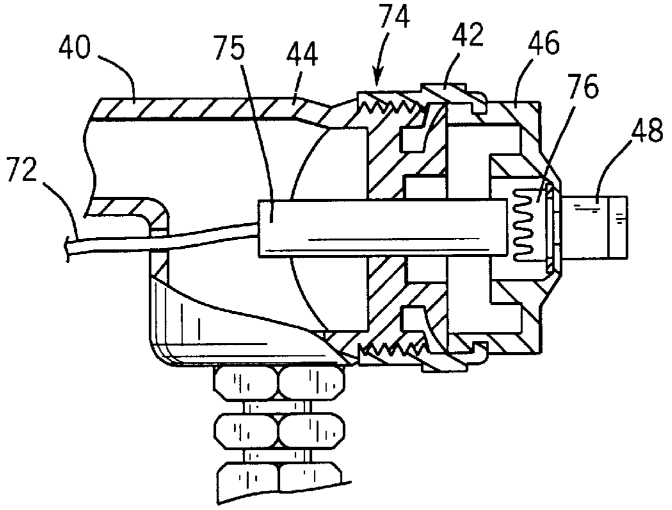
FIG. 2
FIG. 3
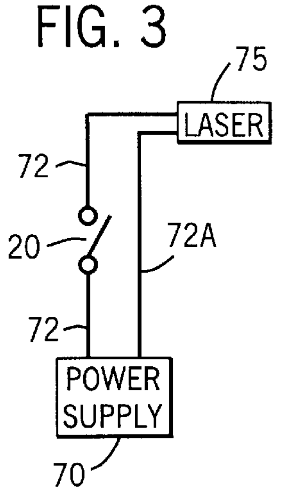
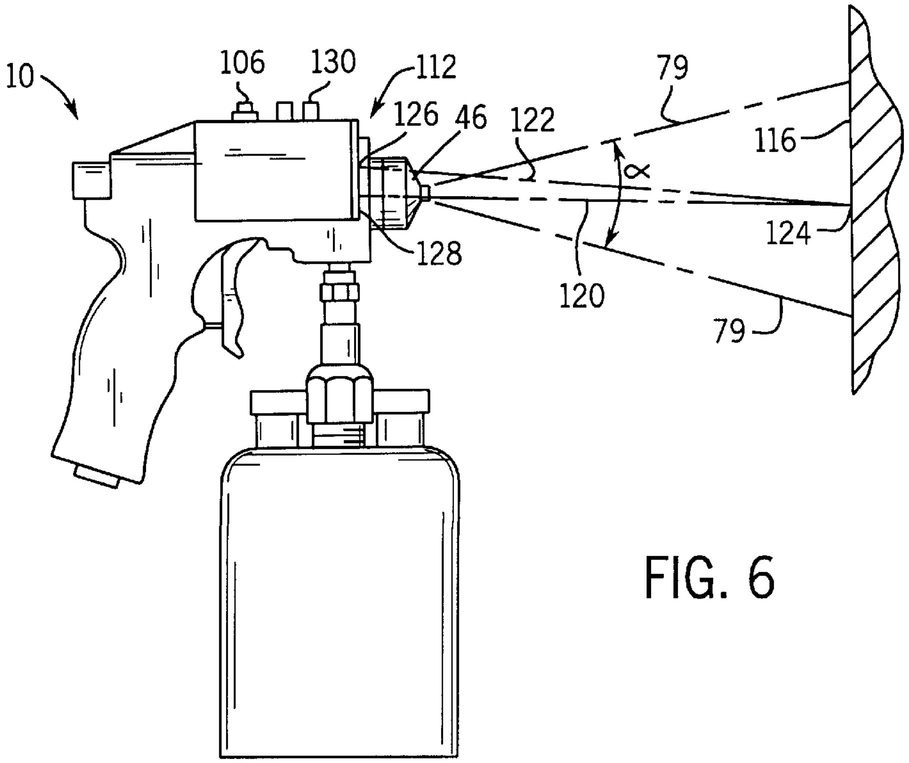
FIG. 6

FIG. 7
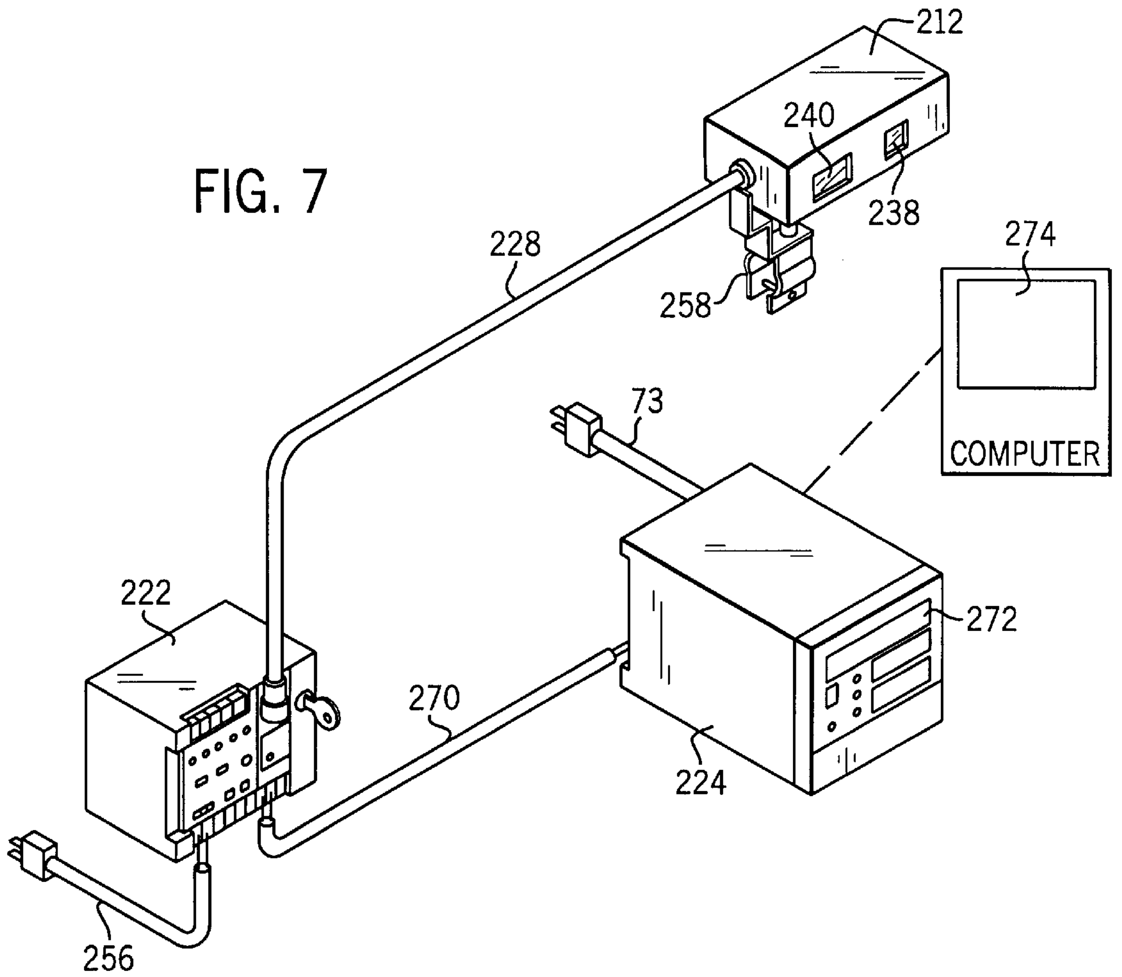
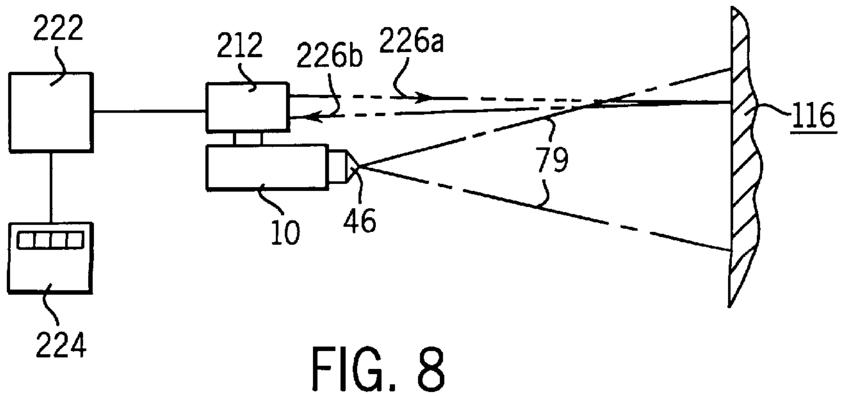
FIG. 8

OPTICAL SPRAY PAINTING PRACTICE AND TRAINING SYSTEM

FIELD OF THE INVENTION

The invention relates to spray painting. In particular, the invention relates to a system for practicing and training proper spray painting techniques.

BACKGROUND OF THE INVENTION

It can be difficult for a person using a spray paint gun to keep the spray nozzle at the optimum distance and orientation from the surface being painted, while at the same time applying the proper thickness of paint to the surface. This is especially difficult for novices. Therefore, providing training and practice experience is desirable to help novices improve their skills.

As an example of the difficulties facing novices, consider that merely placing the nozzle too close to the surface can cause an uneven wet film build as well as runs. The quality and uniformity of paint coverage typically improves as the distance between the spray nozzle and the surface increases, however, it is not desirable that the spray distance between the nozzle and the surface be substantially larger than an optimum spray distance. Letting the spray distance be too large can cause overspray, paint fogging, or otherwise decrease the efficiency of paint transfer onto the surface. Having the nozzle too far from the surface being painted not only increases the number of coats necessary to provide a sufficient wet film build for proper paint coverage, but also increases the cost of complying with environmental regulations. High levels of overspray and fogging increases the amount of volatile organic compounds that can escape from the spray painting booth, and also increases the amount of hazardous waste that must be disposed of from spray paint system air filtering systems. Because of these difficulties, training programs are currently being implemented to teach novices proper spraying techniques.

BRIEF SUMMARY OF THE INVENTION

The invention is a spray painting practice and training system that has an optical spray painting practice gun. The practice spray gun has a light source that emits a shaped optical beam from the nozzle on the spray gun to illuminate a lighted region on a practice surface which simulates the image of an actual paint spray on the practice surface. In this manner, trainees can practice spray painting techniques without actually using paint, thereby reducing paint costs, clean-up and environmental burdens normally associated with such training.

The preferred practice gun has a light source which includes a laser, such as a class 2 diode laser, that transmits a laser beam and a collimating lens that reshapes the transmitted laser beam to form a diverging optical beam that is emitted from the nozzle of the gun. The diverging beam illuminates an elongated image on the practice surface representing the length and orientation of an actual paint spray on the practice surface. The divergence angle of the diverging beam is preferably fixed so that the length of the elongated image on the practice surface is linear with respect to the distance of the nozzle from the practice surface, as with a conventional spray painting gun. The illuminated image on the practice surface distorts if the practice gun in not held perpendicular to the practice surface.

The laser receives electrical power from a power supply, such as a DC battery. A trigger-actuated electric switch regulates electrical power to the laser such that the diverging beam is emitted to illuminate the elongated image on the practice surface when the trigger is engaged.

The battery is preferably contained within the removable container which normally contains paint for a conventional spray gun. Placing the battery within the container helps to simulate the typical weight and weight distribution of a conventional spray gun. Preferably, the structure of the practice optical spray gun is as similar to a conventional spray gun as possible. In fact, to carry out the invention, it may be desirable to merely modify an existing spray gun. A typical spray gun structure includes a spray gun base, a spray head including a spray nozzle connected to the base, a handle and a trigger, and a removable paint container connected to the base. The collimating lens is preferably mounted on a rotatable nozzle collar so that the orientation of the elongated image on the practice surface can be adjusted, normally between a vertical orientation and a horizontal orientation. This simulates rotation of paint spray on conventional spray guns.

In some applications, it may be desirable to implement the practice spray gun in conjunction with the laser beam converging point optimization unit disclosed in U.S. Pat. No. 5,598,972, entitled “Optical Spray Paint Optimization System and Method”, by Klein, II et al., issued on Feb. 4, 1997; and/or the optical monitoring unit disclosed in copending patent application Ser. No. 08/658,935 entitled “An Optical Spray Coating Monitoring System and Method”, by Klein, II et al., filed on May 30, 1996, both incorporated herein by reference.

The invention is also useful for practicing and training spray gun technique for coatings other than paint, such as powder coatings. Other features and advantages of the invention should be apparent upon inspecting the drawings, the following description of the drawings and the claims.

BRIEF DESCRIPTION OF THE SEVERAL VIEWS OF THE DRAWING

FIG. 2 is a sectional view showing a light source in the optical spray painting practice gun shown in FIG. 1;

FIG. 3 is a diagram illustrating electrical connections in the spray painting practice gun shown in FIG. 1;

FIG. 6 is a side elevational view illustrating the spray painting practice gun shown in FIG. 1 implemented in conjunction with a converging laser beam optical paint optimization unit;

FIG. 7 is a schematic view showing the various components of an optical spray coating monitoring system that can be used in conjunction with the spray painting practice gun shown in FIG. 1;

FIG. 8 is a schematic view illustrating operation of the optical spray coating monitoring system when used in conjunction with the spray painting practice gun shown in FIG. 1.

DETAILED DESCRIPTION OF THE INVENTION

Figure 1:
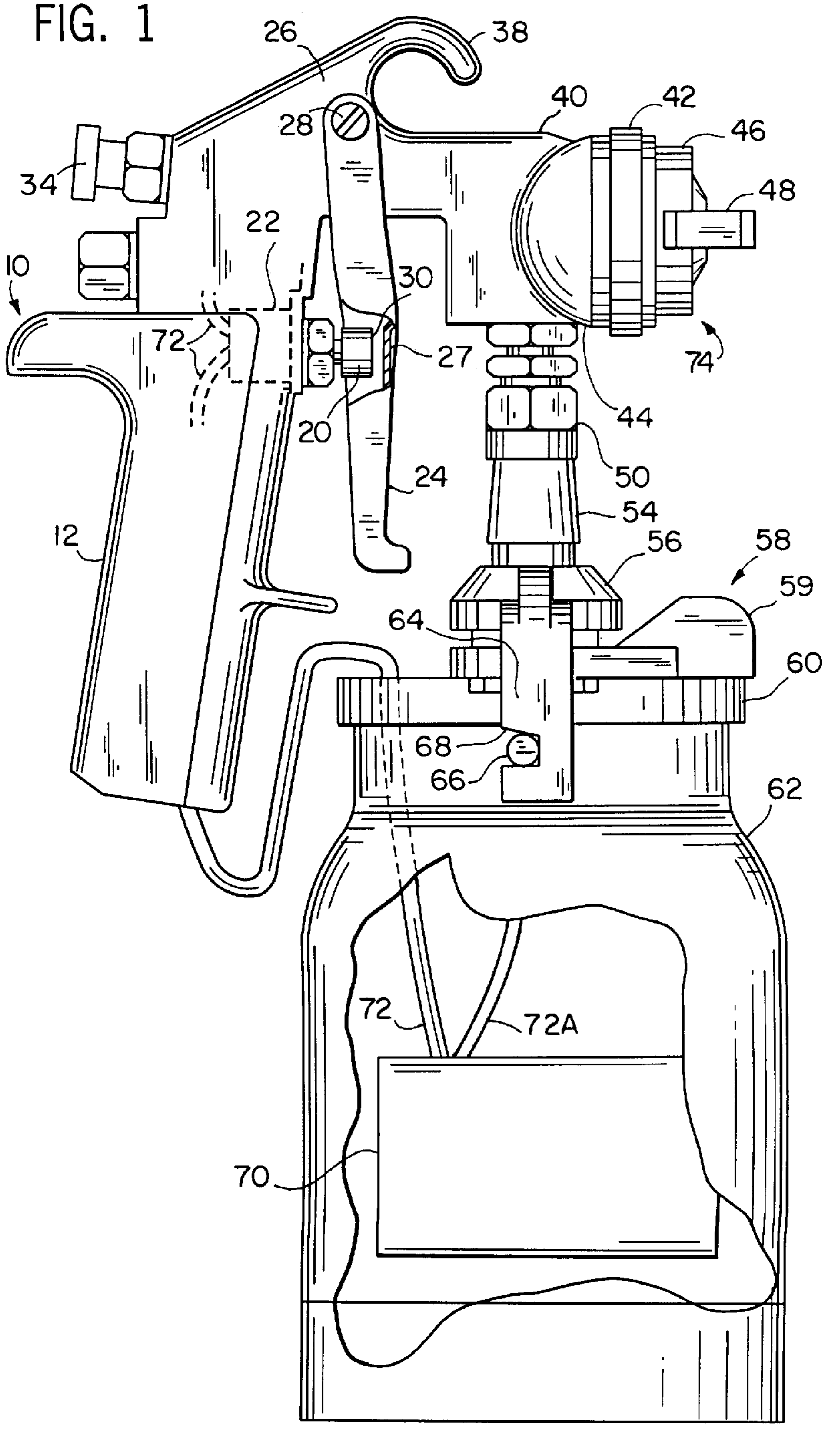
FIG. 1 is a side elevational view of an optical spray painting practice gun in accordance with the present invention.

An optical spray painting practice gun in accordance with the invention is shown in FIG. 1 and is designated generally by reference numeral 10. The practice spray gun 10 is a training device. Therefore, when constructing the practice spray gun 10, it may be desirable to simply modify a conventional spray painting gun to best simulate realistic operating conditions for a user of the spray painting practice gun 10. These modifications are generally the addition of a light source 74 which optically simulates a paint spray, the addition of a trigger-actuated electric switch 20 and the addition of a battery pack 70 which provides power to the light source 74. The modifications are made such that the weight and configuration of the spray painting practice gun 10 remains as close to a conventional painting gun as possible.

The trigger-actuated electric switch 20 replaces the standard pressure valve switching mechanism on a conventional paint spray gun. In a conventional spray gun, the pressure valve controls the flow of compressed air through the gun to generate the paint spray. In the practice gun 10, the electric switch 20 is a normally-open, push-button switch which, when depressed, closes and completes an electric circuit to the light source 74. The light source 74 optically simulates a paint spray when the switch 20 is closed. Electric switch 20 is loosely enclosed by trigger 24. Trigger 24 is pivotally attached to the practice gun shoulder 26 by screws 28 on both sides of the shoulder 26. The trigger 24 extends downwardly from the practice gun shoulder 26. Trigger 24 is preferably shaped similar to the trigger of a conventional paint spray gun. The inside surface of the trigger 24 has a switch contact platform 27. The switch contact platform 27 provides a flat contact surface for the trigger 24 against a front surface 30 of the electric switch 20.

The power supply 70 is located within a removable paint container 62 on the practice gun 10 to provide electric power for the light source 74. The power supply 70 is preferably a DC battery. The battery 70 supplies electrical power via wire 72 to the trigger-activated electric switch 20. Wire 72 continues from electric switch 20 to the light source 74, FIG. 2. The placement of the power supply 70 within the removable paint container 62 helps to simulate the typical weight distribution of a conventional spray gun, and therefore aids in the teaching process. The additional weight of the battery simulates having actual paint within the removable paint container 62 as would occur in a conventional spray gun. The removable paint container 62 is removably secured to the practice spray gun 10 in the same manner as on a conventional spray gun. In particular, the removable paint container 62 is secured to a paint container lid 60 on the practice gun 10 using a securing latch mechanism 58. The paint container lid 60 is connected to a stem 50 that extends downward from the spray gun 10 forward of the handle 12. The stem base 54 extends through a collar 56 and a rotatable securing latch lever 59, and is connected to the lid 60. The collar 56 includes a pair of notched collar arms 64. The notches 68 on the collar arms 64 are positioned to receive securing pins 66 on the removable paint container. The securing pins 66 extend outwardly from the side of the removable paint container. The rotatable latch lever 59 includes a graduated sloping surface as is known in the art. By rotating the lever 59, contact is made with collar 56 and the lever pushes the collar upward. The upward motion tightens the collar arm 64 against the pins 66 to secure the removable paint container 62 to the practice gun 10.

Practice spray gun shoulder 26 and handle 12 should be the same or similar to a conventional spray gun. For instance, the practice gun 10 should include an adjustable knob 34 on the practice gun shoulder 26. On a conventional spray gun, the adjustable knob 34 is used to adjust compressed air pressure which in turn affects paint spray characteristics. For training purposes, it is desirable to have the adjustable knob 34 present on the practice gun 10, however, it is likely that the adjustable knob 34 on the spray gun 10 will not actively affect operation of the practice gun 10. Preferably, the practice gun shoulder 26 also includes an integral hook 38 that extends forwardly therefrom. The hook 38 provides the capability of hanging the practice gun 10 when the gun 10 is not in use.

A nozzle head assembly 40 extends forward from the practice gun shoulder 26. The nozzle head assembly 40 includes a nozzle assembly base 44, and an nozzle coupling 42 that is threadedly attached to the nozzle assembly base 44. A rotatable nozzle collar 46 is rotatably attached to the nozzle coupling 42. In this embodiment of the invention, the position of the rotatable nozzle collar 46 is maintained by friction between the nozzle collar 46 and the nozzle coupling 42. The nozzle collar 46 includes two flanges 48 which facilitate rotation of the nozzle collar 46 with respect to the nozzle coupling 42.

Referring now to FIG. 2, the light source 74 contains a laser 75 and a beam shaper 76. The laser 75 is preferably a class 2 diode laser. When the laser 75 receives electrical power, the laser emits a laser beam towards the beam shaper 76 which is in the forward direction of the practice gun 10. The beam shaper 76 is preferably a collimating lens. The collimating lens 76 reshapes the transmitted laser beam to form a shaped optical beam that simulates an actual paint spray on the practice surface. The shaped optical beam propagates from the collimating lens 76 through a nozzle opening 81 in the nozzle collar 46. The nozzle opening 81 is preferably circular and centered about the rotation axis for the nozzle collar 46. The preferred diameter of the circular nozzle opening 81 is about ⅛ of an inch. The shaped optical beam emitted from the collimating lens 76 has a fixed divergence angle $\alpha$, FIG. 6, so that the length of the elongated image on the practice varies linearly with respect to the distance of the nozzle collar 46 from the practice surface 116, FIG. 6. If desired, the diameter of the circular nozzle opening 81 can be reduced or enlarged to change the fixed divergence a of the shaped optical beam. That is, the diameter of the circular nozzle opening can be modified to alter the length characteristics of the elongated image on the practice surface 116 with respect to the distance between the nozzle collar 46 and the practice surface 116. In the preferred embodiment of the invention, the shaped optical beam emitted from the collimating lens 76 illuminates an elongated image on the practice surface simulating the length and orientation of an actual paint spray on the practice surface 116. The length of the lighted image is determined by the distance between the nozzle collar 46 and the practice surface 116, FIG. 6. The orientation of the lighted image on the practice surface is determined by the rotation of the nozzle collar 46 with respect to the nozzle coupling 42. If the practice gun 10 is not held perpendicular to the practice surface 116, the lighted image on the practice surface distorts, thus indicating to the user that the practice gun 10 is not being held at the proper attitude.

Referring now generally to FIGS. 1 through 3, the practice gun 10 is operated by pulling trigger 24 toward handle 12 to physically engage the push-button electric switch 20. Engagement of the switch 20 closes the electrical connection from power supply 20 to laser 75 through lines 72 and 72A. The wire 72 connects the positive terminal on the power supply 70 to the laser 75, and wire 72A connects the negative terminal on the power supply 70 to the laser 75.

Figure 4A:
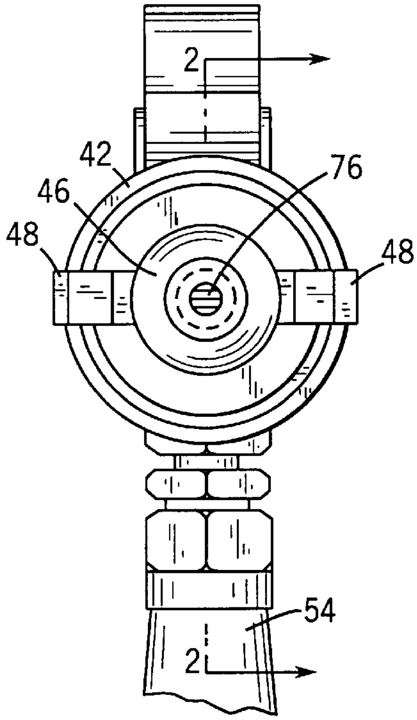
FIG. 4A is a partial frontal view of the practice gun of FIG. 1 showing a practice gun nozzle in a horizontal position.
Figure 5A:
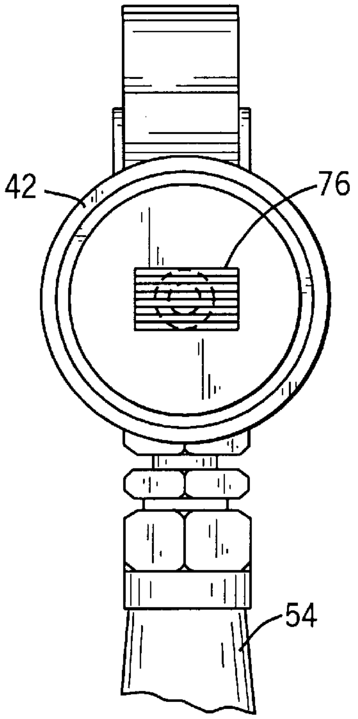
FIG. 5A is a view similar to FIG. 4A with the nozzle removed to illustrate the collimating lens in a horizontal position.
Figure 4B:
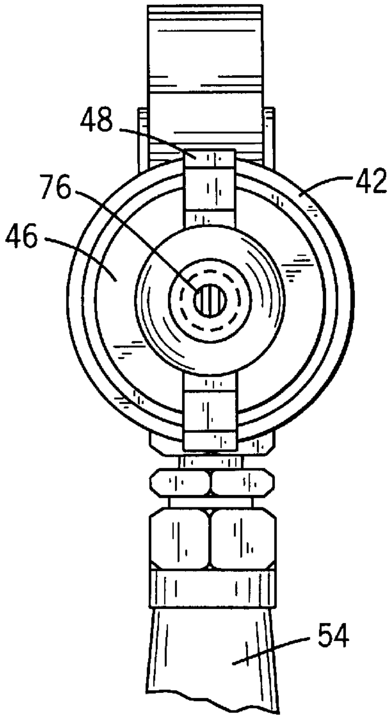
FIG. 4B is a view similar to FIG. 4A showing the nozzle rotated a quarter turn in a vertical position.
Figure 5B:
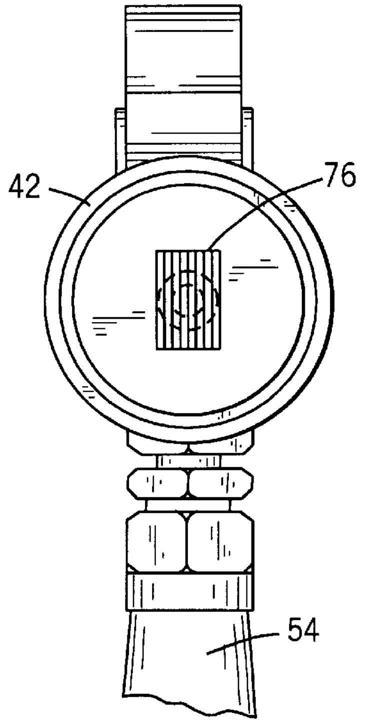
FIG. 5B is a view similar to FIG. 4B with the nozzle removed to illustrate the collimating lens in a vertical position.

Referring now to FIGS. 4A, 4B, 5A and 5B, the collimating lens 76 is connected to the rotatable nozzle collar 46. The collimating lens 76 lies parallel to an axis passing through the flanges 48 on the nozzle collar 46. Flanges 48 are turned to rotate the collimating lens 76 and change the orientation of the lighted region illuminated on the practice surface 116. Preferably, the user should rotate the nozzle collar 46 at 90° intervals in order to provide a substantially horizontal or a substantially vertical lighted region on the practice surface 116, which simulates proper painting techniques. FIG. 4A shows the nozzle flanges 48 and the collimating lens 76 in a horizontal position. FIG. 4B shows the nozzle flanges 48 and the collimating lens 76 in a vertical position. The nozzle collar 46 is removed in FIGS. 5A and 5B, which clearly show the positioning of the collimating lens 76 when the nozzle flanges 48 are in the horizontal position, FIGS. 4A and 5A, and in the vertical position, FIGS. 4B and 5B, respectively.

Referring now to FIG. 6, the practice gun 10 can be implemented in conjunction with a converging laser beam optical paint optimization unit 112, as disclosed in U.S. Pat. No. 5,598,972, entitled "Optical Spray Paint Optimization System and Method", by Klein, II et al., issued on Feb. 4, 1997. In FIG. 6, the shaped optical beam 79 is shown to be emitted from the spray gun nozzle 46 onto the practice surface 116. The converging laser beam optical paint optimization unit 112 is used to help the user hold the practice gun 10 at a proper distance from the practice surface 116. The unit 112 is mounted to the spray practice gun 10 by securing the unit 112 to the practice gun 10 with a screw or bolt 106.

The paint optimization unit 112 emits two converging laser beams, a reference beam 120 and a gauge beam 122. It is preferred that the optical unit 112 be mounted to the practice spray gun 10 such that the reference beam 120 propagates in the same forward direction as defined generally by the direction of the nozzle 46 and the shaped optical beam 79. In other words, the reference beam 120 should propagate in the same forward direction that the practice gun 10 is aimed. The reference beam 120 illuminates the wall surface 116 at a reference illumination location. The gauge beam 122 is emitted from the optical unit 112 at a location 126 that is offset from the location 128 where the reference beam 120 is emitted from the unit 112. The gauge beam 122 propagates from the unit 112 and intersects the reference beam 120 at a convergence point illustrated in FIG. 6 as point 124 on the practice surface 116. If the nozzle 46 is too close or too far from the practice surface 116, the gauge beam 122 and the reference beam 120 will each illuminate a separate point on the practice surface 116, rather than illuminating a single point convergence point 124 on the practice surface 116. Therefore, the user of the practice gun 10 can easily determine when the practice gun 10 is located a proper distance from the surface 116.

A control knob 130 located on top of the optical unit 112 adjusts the direction that the gauge beam 122 propagates, thereby adjusting the distance of the convergence point 124 from the nozzle collar 46, i.e. adjusting the location where the gauge beam 122 intersects the reference beam 120. The control knob 130 is preferably calibrated so that a user can easily select the distance of the convergence point 124 from the unit 112 along the reference beam 120. In this manner, a user can preselect a desired practice distance, and can maintain the nozzle collar 46 from the surface 116 at the preselected practice distance by locating the convergence point 124 on the practice surface 116.

Referring now to FIGS. 7 and 8, the practice spray gun 10 can also be used in conjunction with the optical spray paint monitoring system disclosed in copending patent application Ser. No. 08/658,935 entitled "Optical Spray Coating Monitoring System and Method", by Klein, II et al., filed on May 30, 1996, incorporated herein by reference. The optical spray paint monitoring system includes a sensor head 212 mounted to the practice gun 10, a controller 222 and a data acquisition system 224. The optical spray paint monitoring system measures and monitors the actual distance of the nozzle collar 46 from the practice surface 116 and also the angle or orientation of the practice gun 10 with respect to the practice surface 116.

The monitoring system includes a laser displacement sensor which is comprised of the sensor head 212 and the controller 222. The sensor head 212 is mounted to the practice gun 10, but it is preferred that the controller 222 be remote from the gun 10. Controller 222 receives AC power from a conventional outlet through cord 256, and transmits power through cable 228 to the sensor head 212. The sensor head 212 includes a bracket 258 that is used to removable attach the sensor head 212 to a boom on the practice gun 10. It is preferred that the sensor head 212 be mounted vertically so that the windows 238 and 240 on the sensor head 212 are aligned vertically, see FIG. 8. The sensor head 212 uses an optical beam 226*a,* 226*b* to measure the distance of the nozzle collar 46 from the practice surface 116, and generates an analog displacement signal in response thereto. The analog displacement signal is transmitted from the sensor head 212 through line 228 to controller 222. In the controller 222, the analog displacement signal is filtered and amplified. The preferred laser displacement sensor (i.e. sensor head 212 and controller 222) can detect distances up to about 18 to 20 inches, which is preferred for teaching because in most painting applications the spray gun should not be held more than 18 to 20 inches from the painted surface.

The sensor head 212 emits a transmitting optical beam 226*a* through window 238 that impinges on the practice surface 116, and reflects at least partially to the sensor head 212 through window 240 as depicted by reference numeral 226*b*. The laser displacement sensor 220 measures the reflected optical beam 226*b* to determine the distance from the sensor head 212 to the practice surface 116, and generates the displacement signal in response to the measurement.

It is preferred that the laser displacement sensor have the capability of measuring an angle of orientation of the sensor head 212 with respect to the practice surface 116. The laser displacement sensor measures the angle of orientation and generates an angle of orientation signal in response thereto. As long as the sensor head 212 is mounted so that the transmitting and receiving windows 238 and 240 face a direction parallel to an imaginary line projecting from the nozzle collar 46 to the center location of the lighted region on the practice surface 116, the measured angle of orientation will be indicative of the angle of orientation of the spray gun 10. That is, the direction of the angle of orientation depends on the direction in which the sensor head 212 is mounted to the spray gun 10. Normally, the sensor head 212 should be mounted vertically because it is more difficult to keep a practice spray gun 10 from being tilted horizontally than from side to side.

It is preferred that a displacement signal and an orientation signal be generated in the controller 222, and transmitted in analog through line 270 to data acquisition system 224. In the data acquisition system 224, the information can be converted to digital data, analyzed and displayed in real time on display 272, or stored in electronic memory. The stored information can be downloaded to a computer 274 for further analysis.

It should be appreciated that various equivalents, alternatives, and modifications aside from those expressly stated may be possible. Such equivalents, alternatives and modifications which do not substantially depart from the spirit of the invention should be considered to come within the scope of the following claims.

I claim:

1. An optical spray painting practice gun comprising:

a practice spray gun body having a handle and a nozzle;

a light source that emits a shaped optical beam from the nozzle on the practice spray gun to illuminate a lighted region on a practice surface and simulate an actual paint spray on the practice surface without spraying paint from the nozzle onto the practice surface, the lighted region on the practice surface being an image simulating the length and orientation of actual spray paint spray on the practice surface;

an electrical power supply that supplies power to the light source; and a trigger-actuated electric switch interposed between the power supply and the light source, wherein the light source emits the shaped optical beam from the nozzle to illuminate the lighted region on the practice surface when the trigger-actuated electric switch is engaged.

2. An optical spray painting practice gun as recited in claim 1 wherein the optical beam emitted from the nozzle has a fixed divergence angle α so that the length of the elongated image on the practice surface varies linearly with respect to a distance of the nozzle from the practice surface.

3. An optical spray painting practice gun as recited in claim 1 wherein the nozzle includes a rotatable collar that adjusts the orientation of the elongated image on the practice surface.

4. An optical spray painting practice gun comprising:

a practice spray gun body having a handle and a nozzle;

a light source that emits a shaped optical beam from the nozzle to illuminate a lighted region on a practice surface and simulate an actual paint spray on the practice surface;

an electrical power supply that supplies power to the light source; and a trigger-actuated electric switch interposed between the power supply and the light source, wherein the light source emits the shaped optical beam from the nozzle to illuminate the lighted region on the practice surface when the trigger-actuated electric switch is engaged;

a laser that receives power from the electrical power supply and transmits a laser beam; and a beam shaper that reshapes the transmitted laser beam to form the shaped optical beam that simulates an actual paint spray on the practice surface.

5. An optical spray painting practice gun as recited in claim 4 wherein the beam shaper is a collimating lens.

6. An optical spray painting practice gun as recited in claim 4 wherein the nozzle includes a rotatable collar and the beam shaper is mounted thereto so that rotating the collar adjusts orientation of the lighted region on the practice surface.

7. An optical spray painting practice gun comprising:

a practice spray gun body having a handle and a nozzle;

a light source that emits a shaped optical beam from the nozzle to illuminate a lighted region on a practice surface and simulate an actual paint spray on the practice surface without spraying paint from the nozzle onto the practice surface, the lighted region on the practice surface being an image simulating the length and orientation of actual paint sprayed on the practice surface;

an electrical power supply that supplies power to the light source; and a trigger-actuated electric switch interposed between the power supply and the light source, wherein the light source emits the shaped optical beam from the nozzle to illuminate the lighted region on the practice surface when the trigger-actuated electric switch is engaged;

wherein the trigger-actuated electric switch includes a push-button electric switch that is normally open unless engaged.

8. An optical spray painting practice gun as recited in claim 7 wherein the trigger-actuated electric switch further includes a trigger lever mounted to the spray gun body for physical engagement with the push-button switch.

9. An optical spray painting practice gun as recited in claim 1 wherein the spray gun body further comprises a removable container which contains the electrical power supply.

10. An optical spray painting practice and training system comprising:

an optical spray painting practice gun including a practice spray gun body having a handle and a nozzle, a light source that emits a shaped optical beam from the nozzle on the practice spray gun to illuminate a lighted region on a practice surface and simulate actual paint spray on the practice surface without spraying paint from the nozzle onto the practice surface, the lighted region on the practice surface being an image simulating the length and orientation of actual paint sprayed on the practice surface, an electrical power supply that supplies power to the light source, and a trigger-actuated electric switch interposed between the power supply and the light source, wherein the light source emits the shaped optical beam from the nozzle to illuminate the lighted region on the practice surface when the trigger-actuated electric switch is engaged; and a laser beam converging point optimization unit mounted to the spray gun body, the converging point optimization unit emitting a reference beam and a gauge beam that converge at a convergence point position at a selected distance from the nozzle of the practice spray gun body.

11. A system as recited in claim 10 wherein the reference beam from the converging point optimization unit illuminates on the practice surface at a location roughly positioned at the mid-width of the path of the lighted region created by the illumination of the shaped optical beam on the practice surface.

12. A system as recited in claim 10 wherein the reference beam from the converging point optimization unit is located in a horizontal plane passing through the center of the nozzle.

13. A system as recited in claim 10 further comprising:

a monitoring unit including a laser displacement sensor that measures the distance of the nozzle from the practice surface and generates a displacement signal in response thereto, and electronic memory that stores data representative of the displacement signal.

14. A system as recited in claim 10 further comprising:

a monitoring unit including a laser displacement sensor that measures the orientation of the nozzle with respect to the practice surface and generates an orientation signal in response thereto, and electronic memory that stores data representative of the orientation signal.

15. An optical spray painting practice and training system comprising:

an optical spray painting practice gun including a practice spray gun body having a handle and a nozzle, a light source that emits a shaped optical beam from the nozzle on the practice spray gun to illuminate a lighted region on a practice surface and simulate actual paint spray on the practice surface without spraying paint from the nozzle onto the practice surface, the lighted region on the practice surface being an image simulating the length and orientation of actual paint sprayed on the practice surface, an electrical power supply that supplies power to the light source, and a trigger-actuated electric switch interposed between the power supply and the light source, wherein the light source emits the shaped optical beam from the nozzle to illuminate the lighted region on the practice surface when the trigger-actuated electric switch is engaged; and a monitoring unit including a laser displacement sensor that measures the distance of the nozzle from the practice surface and generates a displacement signal in response thereto, and electronic memory that stores data representative of the displacement signal.

16. A system as recited in claim 15 wherein the monitoring unit further comprises:

a display for displaying the data representative of the displacement signal in real time.

17. A system as recited in claim 15 wherein the laser displacement sensor also measures an angle of orientation between an imaginary line projecting from the nozzle to the center location of the lighted region on the practice surface and generates an orientation signal in response thereto; and wherein the electronic memory also stores data representative of the orientation signal.

18. An optical spray painting practice and training system comprising:

an optical spray painting practice gun including a practice spray gun body having a handle and a nozzle, a light source that emits a shaped optical beam from the nozzle on the practice spray gun to illuminate a lighted region on a practice surface and simulate actual paint spray on the practice surface without spraying paint from the nozzle onto the practice surface, the lighted region on the practice surface being an image simulating the length and orientation of actual paint sprayed on the practice surface, an electrical power supply that supplies power to the light source, and a trigger-actuated electric switch interposed between the power supply and the light source, wherein the light source emits the shaped optical beam from the nozzle to illuminate the lighted region on the practice surface when the trigger-actuated electric switch is engaged; and a monitoring unit including first and second laser displacement sensors each mounted to the spray gun, the first laser displacement sensor generating a first displacement signal and the second laser displacement sensor generating a second laser displacement signal, and the monitoring unit further including electronic memory that stores data representative of the first and second displacement signals.

* * * * *